United States Patent [19]

Hamada et al.

[11] Patent Number: 5,158,274
[45] Date of Patent: Oct. 27, 1992

[54] GROUP SUPERVISORY SYSTEM FOR MOVING SHEETS BETWEEN MULTIPLE AUTOMATONS

[75] Inventors: Yasunori Hamada, Tsuchiura; Shigeru Sasaki, Ibaraki; Masao Okayama, Ryugasaki; Masataka Kawauchi, Ishioka; Naoya Sasaki, Ibaraki; Haruo Yamanaka, Seto, all of Japan

[73] Assignee: Hitachi, Ltd., Tokyo, Japan

[21] Appl. No.: 365,551

[22] Filed: Jun. 13, 1989

[30] Foreign Application Priority Data

Jun. 15, 1988 [JP] Japan ................... 63-145755
Jun. 15, 1988 [JP] Japan ................... 63-145757
Jun. 15, 1988 [JP] Japan ................... 63-145758

[51] Int. Cl.⁵ .................. B65H 3/44; G06F 15/30
[52] U.S. Cl. .......................... 271/9; 271/225; 271/272; 235/379
[58] Field of Search ................ 271/9, 184–186, 271/225, 272; 235/379

[56] References Cited

U.S. PATENT DOCUMENTS

| | | | |
|---|---|---|---|
| 2,995,363 | 8/1961 | Pittwood | 271/272 |
| 3,973,770 | 8/1976 | Montenbruck | 271/272 |
| 4,447,714 | 5/1984 | Lundblad | 235/379 |
| 4,638,434 | 1/1987 | Aizaki | 235/379 |
| 4,697,708 | 10/1987 | Goto et al. | 235/379 |
| 4,703,162 | 10/1987 | Holland-Letz et al. | 235/379 |
| 4,736,852 | 4/1988 | Edin et al. | 271/184 |
| 4,775,783 | 10/1988 | Sasaki et al. | 235/379 |
| 4,866,254 | 9/1989 | Okayama et al. | 271/9 |

FOREIGN PATENT DOCUMENTS 17582 1/1985 Japan .
17577 1/1986 Japan .

Primary Examiner—Robert P. Olszewski
Assistant Examiner—Steven M. Reiss
Attorney, Agent, or Firm—Antonelli, Terry, Stout & Kraus

[57] ABSTRACT

At least one automaton for collectively controlling media inclusive of notes in a shop is located in a first corner, at least one automaton operated by customers is located in a second corner and at least one automaton operated by a clerk who is contacting or negotiating with a customer is located in a third corner. The automatons in individual corners are interconnected together by a sheet conveyor for aligning and conveying the media such as notes one by one. The amount of media stored in each automaton in each corner is always supervised and media are conveyed between automatons, as necessary, to effect supplementation/withdrawal of media. Furthermore, sheets are conveyed between opposed magnetic belts.

7 Claims, 16 Drawing Sheets

1000: MEDIUM CONVEYANCE POSTURE CHANGING MECHANISM

FIG. 10

| CODE j | NUMBER OF MEDIA n |
|---|---|
| 0 | $n = 0$ |
| 1 | $0 < n \leq n_1$ |
| 2 | $n_1 < n \leq n_2$ |
| ⋮ | ⋮ |
| $\gamma$ | $n_{r-1} < n \leq n_r$ |
| ⋮ | ⋮ |

FIG. 11

| MONTH, DAY | CODE j $t_1$ $t_2$ $t_3$ -- -- -- $t_e$ | PATTERN P |
|---|---|---|
| $X_1$ $Y_1$ | 3  2  2 ---------- 4 | $P_{322----4}$ |
| $X_1$ $Y_2$ | 2  1  0 ---------- 3 | $P_{210----3}$ |
| ⋮ | ---------------- | ------ |
| $X_6$ $Y_{10}$ | 2  1  0 ---------- 3 | $P_{210----3}$ |
| ⋮ | ---------------- | ------ |
| ⋮ | ---------------- | ------ |
| ⋮ | ---------------- | ------ |
| $X_{12}$ $Y_{31}$ | 0  0  0 ---------- 0 | $P_{000----0}$ |

FIG. 12

| CODE α | WEATHER CONDITION |
|---|---|
| 1 | FINE |
| 0.9 | CLOUDY |
| 0.5 | RAINY |
| ⋮ | ----- |

FIG. 13

| CODE β | BUSINESS TREND CONDITION |
|---|---|
| 1.2 | BOOM |
| 1 | UNCHANGED |
| 0.8 | BUST |
| ⋮ | ----- |

FIG. 14

| CODE γ | REGIONAL TREND CONDITION |
|---|---|
| 1.2 | EXPANDED |
| 1 | UNCHANGED |
| 0.8 | REDUCED |
| ⋮ | ----- |

FIG. 15

| CODE δ | MANAGEMENT POLICY CONDITION |
|---|---|
| 1.2 | EXPANDED |
| 1 | UNCHANGED |
| 0.8 | REDUCED |
| ⋮ | ----- |

FIG. 16

| CODE K | DAY OF WEEK AND HOLIDAY CONDITION |
|---|---|
| 1 | WEEKDAY |
| 1.2 | A DAY BEFORE HOLIDAY |
| 0.5 | SERVICE HOLIDAY |
| 0 | HOLIDAY |
| ⋮ | ---- |

GROUP SUPERVISORY SYSTEM FOR MOVING SHEETS BETWEEN MULTIPLE AUTOMATONS

BACKGROUND OF THE INVENTION

This invention relates to a system for performing unified automatic conveyance of media necessary for utilization of individual automatons installed in, for example, financial shops so as to supervise the media in a group and more particularly to a group supervisory system suited to align and convey media one by one.

The invention also pertains to a method of utilizing the group supervisory system in order to supervise one-dimensional conveyance of media necessary for utilization of automatons and automatically convey the necessary amount of media to each automaton when necessary.

Conventionally, in a group supervisory system of this type as disclosed in, for example, JP-A-60-17582 based on a Japanese patent application filed on Jul. 11, 1983, media are inserted in a new cassette, the new cassette is conveyed by means of a carriage to each automaton and an old cassette stored in each automaton is exchanged with the new cassette.

In a known method of utilizing this type of group supervisory system as disclosed in, for example, JP-A-60-17577 based on a Japanese patent application filed on Jul. 11, 1983, shortage of the residual amount of notes or fill-up of notes in each automaton is detected to provide a command by which supplemantation or withdrawal of notes is effected. Detectors for this purpose have a tolerance for avoidance of a delay in handling.

In the conventional system wherein the cassette itself is exchanged, a mechanism for conveyance is increased in size, requiring a large conveyance path width and flexibility of conveyance route layout is not considered sufficiently. In addition, where the passage is used in common for the carriage of persons, safe running of the carriage can possibly be ensured only at the cost of timely conveyance.

Further, in the conventional utilization method wherein supplementation/withdrawal is effected by a command resulting from the detection of shortage of the residual amount or fill-up of notes, a delay will occur in the supplementation/withdrawal processing when a plurality of automatons request supplementation/withdrawal and as a result, a delay of handling will occur inevitably. Conceivably, one way of overcoming this problem is to provide the detection level with a tolerance but unless the optimum amount of media is considered, media must be stored in an unnecessarily excessive amount.

SUMMARY OF THE INVENTION

An object of this invention is to provide a group supervisory system wherein individual automatons are interconnected together by a sheet conveying means which is reduced in size and has flexibility in route layout so as to collectively supervise one-dimensional conveyance of media and automatically perform timely conveyance of a necessary amount of media.

Another object of the invention is to provide a method of utilizing the group supervisory system by which the amount of media that each automaton requires can be predicted for automatic supplementation and withdrawal, and the group supervisory system can be utilized efficiently under various conditions.

In the group supervisory system according to the invention, individual automatons are interconnected together through the sheet conveying means capable of automatically aligning and conveying one by one media necessary for utilization of each automaton.

The connection length of the sheet conveying means depends on layout of the automatons and particularly, in consideration of the amount of media to be conveyed and the conveyance time which are required for efficient utilization of the group supervisory system; the length of a conveyance path connecting automatons in a cashier corner for collectively controlling media such as funds in a shop and automatons in an automaton corner for customer is smaller than the length of a conveyance path connecting automatons in the cashier conveyer and automatons in a window corner.

Preferably, the sheet conveying means interconnecting the automatons may include a mechanism for changing conveyance posture of a medium being conveyed and a medium conveying means such as belts adopted to clamp and convey media, whereby the posture of a medium can be realized for conveyance in each automaton and for conveyance by means of the belts of the sheet conveying means.

Preferably, magnetized belts may be used as the medium conveying means between automatons to ensure steady clamping and conveyance of media.

Each automaton may include a buffer box for temporarily storing media to be conveyed by the sheet conveying means, so that the processes of the automaton per se can be separated from the processes of the sheet conveying means, thereby ensuring efficient utilization of the group supervisory system. Thus, by taking advantage of space and time of each automaton, media can be conveyed by means of the sheet conveying means without causing delay of utilization of each automaton and therefore service to customers can be improved.

Further, thanks to the utilization without resort to manual operation, security can be improved.

When in the group supervisory system constructed as above, the shortage of media necessary for utilization of an automaton occurs, and media are supplied from another automaton having ability to supply required media. The media is automatically aligned and conveyed one by one through the sheet conveying means to the requesting automaton.

The mechanism for changing conveyance posture of a medium allows a medium to take postures suitable for conveyance on different portions of the conveyance path, and the magnetized belts permit steady clamping and conveyance of media.

In the group supervisory system utilizing the method according to the invention, a pattern of amounts of media needed at predetermined times and quantities is prepared and stored for different kinds of media required by each automaton, and timing for supplementation and withdrawal is determined in accordance with the pattern to permit automatic conveyance of media between the automatons or change of display of transaction mode.

The pattern of required amounts of media can be modified automatically during utilization of the automaton or can be modified manually.

Since the individual automatons are interconnected together through the means for automatic conveyance of media, and timely automatic conveyance of the required amounts of media can be carried out at predetermined times in accordance with the pattern of required amounts of media which is stored in control means, the delay of handling of the automaton can be avoided to ensure optimum utilization of media.

The residual amount of media in each automaton can be estimated from changes of increase and decrease in the required amount of media in each automaton to change display of transaction mode, thereby permitting the operator to utilize the automaton efficiently.

BRIEF DESCRIPTION OF THE DRAWINGS

FIGS. 10 to 16 show the contents of information, stored in a memory of FIG. 9, concerning the conveyance amount of media and timing; with FIG. 10 is a code diagram of the number of media; FIG. 11 is a diagram showing a pattern of amounts of media which occur every day at the rate of predetermined times; and FIGS. 12 to 16 are diagrams showing codes of factors affecting the amount of media.

DESCRIPTION OF THE PREFERRED EMBODIMENTS

The invention will now be described by way of example with reference to the accompanying drawings.

Figure 1:
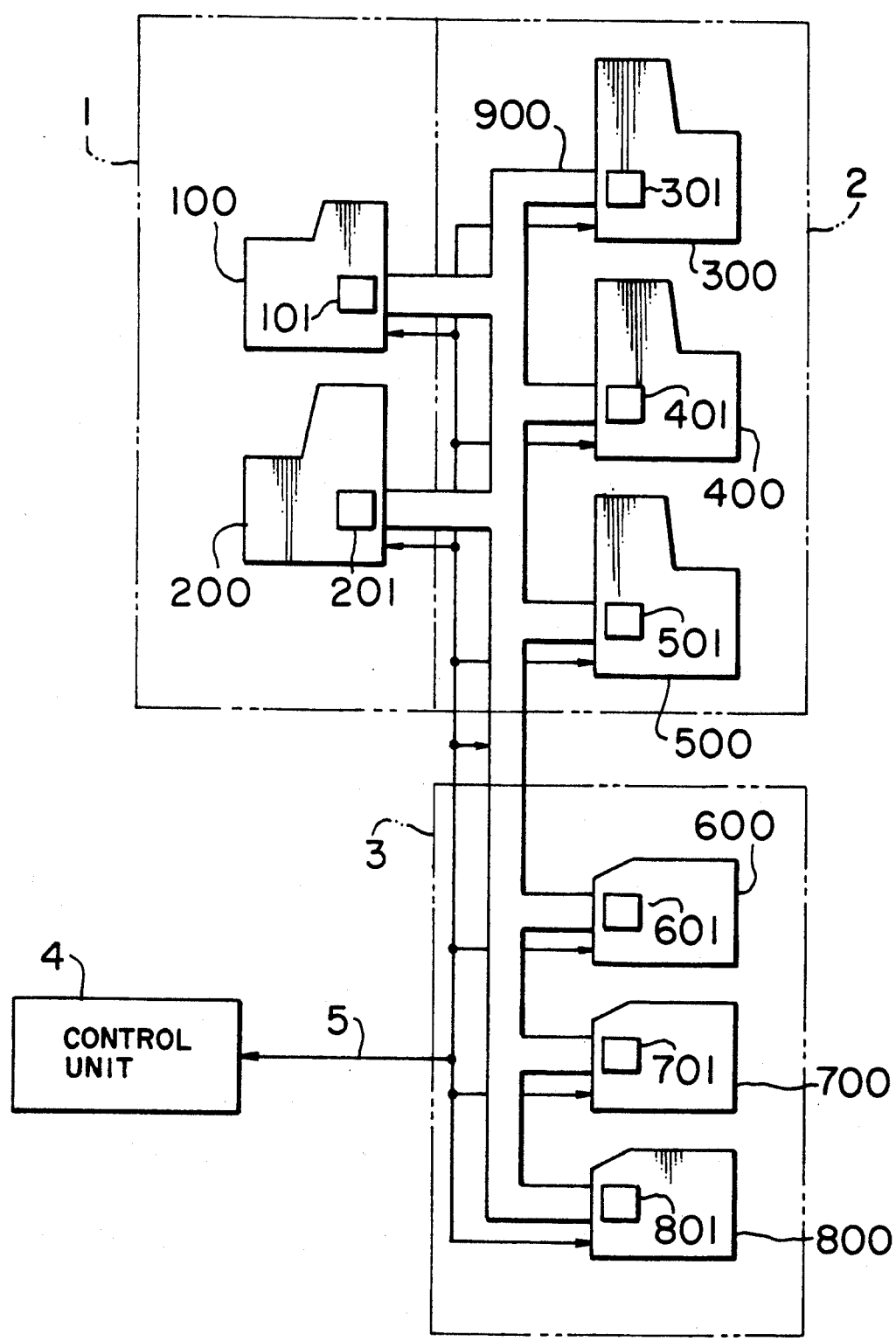
FIG. 1 is a block diagram illustrating an embodiment of a group supervisory system according to the invention.
Figure 2:
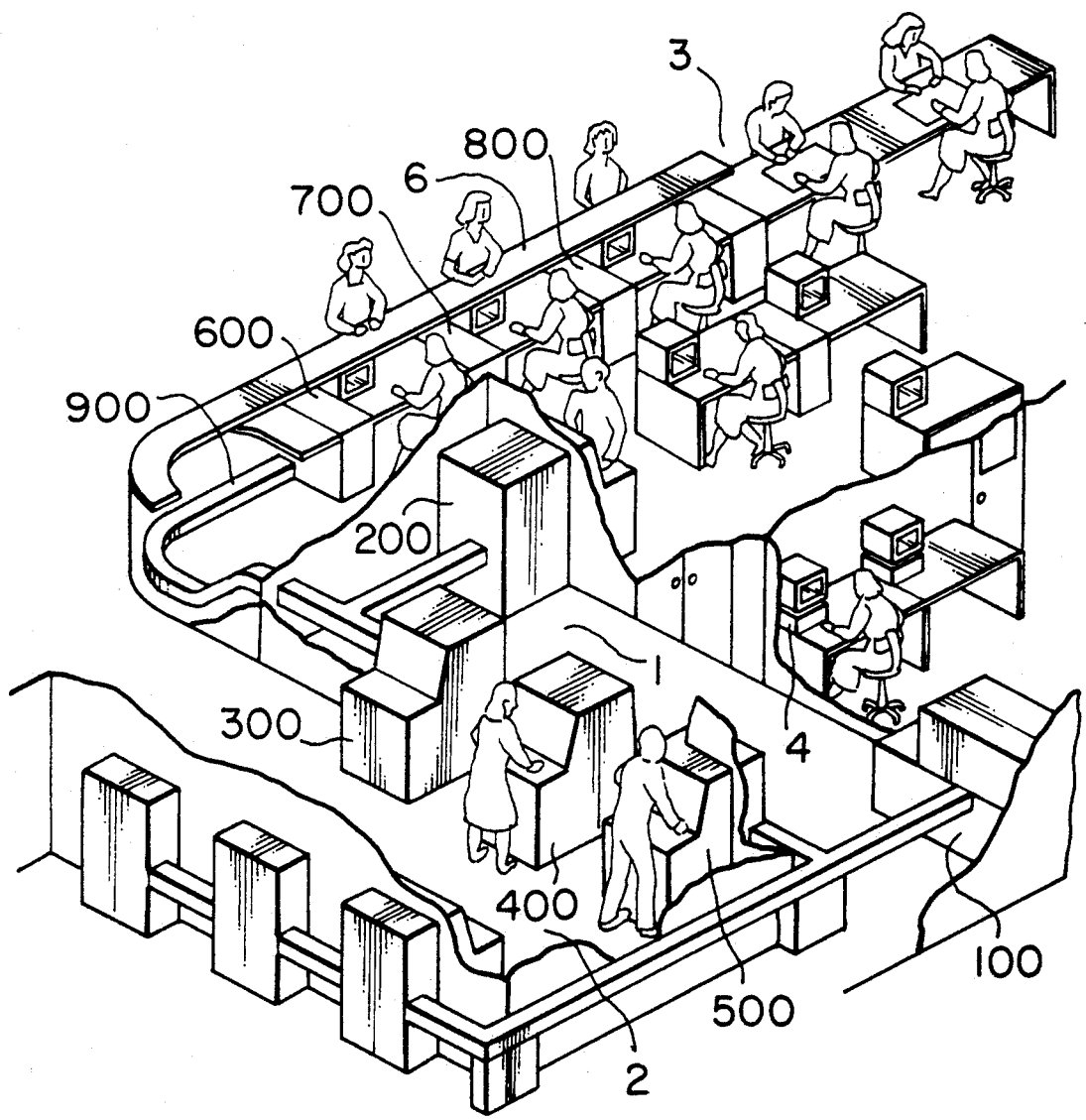
FIG. 2 is a pictorial diagram illustrating a specific example of implementation of the FIG. 1 system.

FIGS. 1 and 2 illustrate an embodiment of a group supervisory system according to the invention in block form and pictorial form, respectively. Referring to FIGS. 1 and 2, there are located in a first corner 1 a cash controller 100 for collectively controlling media such as funds in a shop and an automaton for clerk 200 used by clerks of the shop.

Located in a second corner 2 is at least one of automatons for customer 300, 400 and 500 such as automated teller machines (ATM's) or cash dispensers (CD's), which are operated directly by customers. Located in a third corner 3 is at least one of automatons for window clerk 600, 700 and 800, which are used by clerks who are contacting or negotiating with customers. The automatons 100, 200, 300, 400, 500, 600, 700 and 800 are interconnected together by a sheet conveying means 900 so that media can be conveyed from one automaton to another. Each of the automatons 100, 200, 300, 400, 500, 600, 700 and 800 has a buffer box 101, 201, 301, 401, 501, 601, 701 or 801 which is used for temporarily storing media during delivery and reception of the media to and from the sheet conveying means 900. A control means 4 adapted to control supervision and conveyance of media transferable among the automatons issues commands which are transmitted through a communication means 5 to the automatons to control the same.

Layout of the first to third corners 1, 2 and 3 is such that the sheet conveying means 900 has a shorter length for connecting the automatons 100 and 200 located in the first corner to the automatons 300, 400 and 500 located in the second corner than for connecting the automatons 100 and 200 in the first corner to the automatons 600, 700 and 800 located in the third corner.

In FIG. 2, the sheet conveying means 900 is exemplarily illustrated as being laid on the floor and under a counter 6 in the third corner 3 but alternatively it may be laid in the floor of free-access type, in a groove formed in the floor, inside the ceiling or near the ceiling.

The length of the sheet conveying means 900 is shorter between the first and second corners 1 and 2 than between the first and third corners 1 and 3 as described hereinbefore and therefore, with the sheet conveying means 900 running at a constant speed throughout the first to third corners, the time for conveying the same amount of media is shorter for conveyance from the first corner 1 to the second corner 2 than for conveyance from the first corner 1 to the third corner 3. In other words, during a constant period of time, media can be conveyed by a greater amount between the first and second corners than between the first and third corner. With the recent trend of progressive automation, the amount of media handled in the second corner 2 increases beyond that handled in the third corner 3. Under these circumstances, it is effective for efficient utilization of the group supervisory system that is shown in FIGS. 1 and 2, the first and second corners 1 and 2 are close to each other in order to make the length of the sheet conveying means 900 shorter between the first and second corners 1 and 2 than between the first and third corners 1 and 3.

While in this embodiment the first and second corners 1 and 2 are close to each other, such that a close layout may be selected for other combinations of the corners which depends on the amount of media handled in respective corners.

The layout of the corners may otherwise be designed regardless of the amount of media handled in respective corners, only at the cost of the decreased conveying time, within the framework of the present invention.

Further, one of the cash controller 100 and clerk automaton 200 separately located in the first corner 1 may be omitted and replaced with an automaton operable to fill the role of the two.

Figure 3:
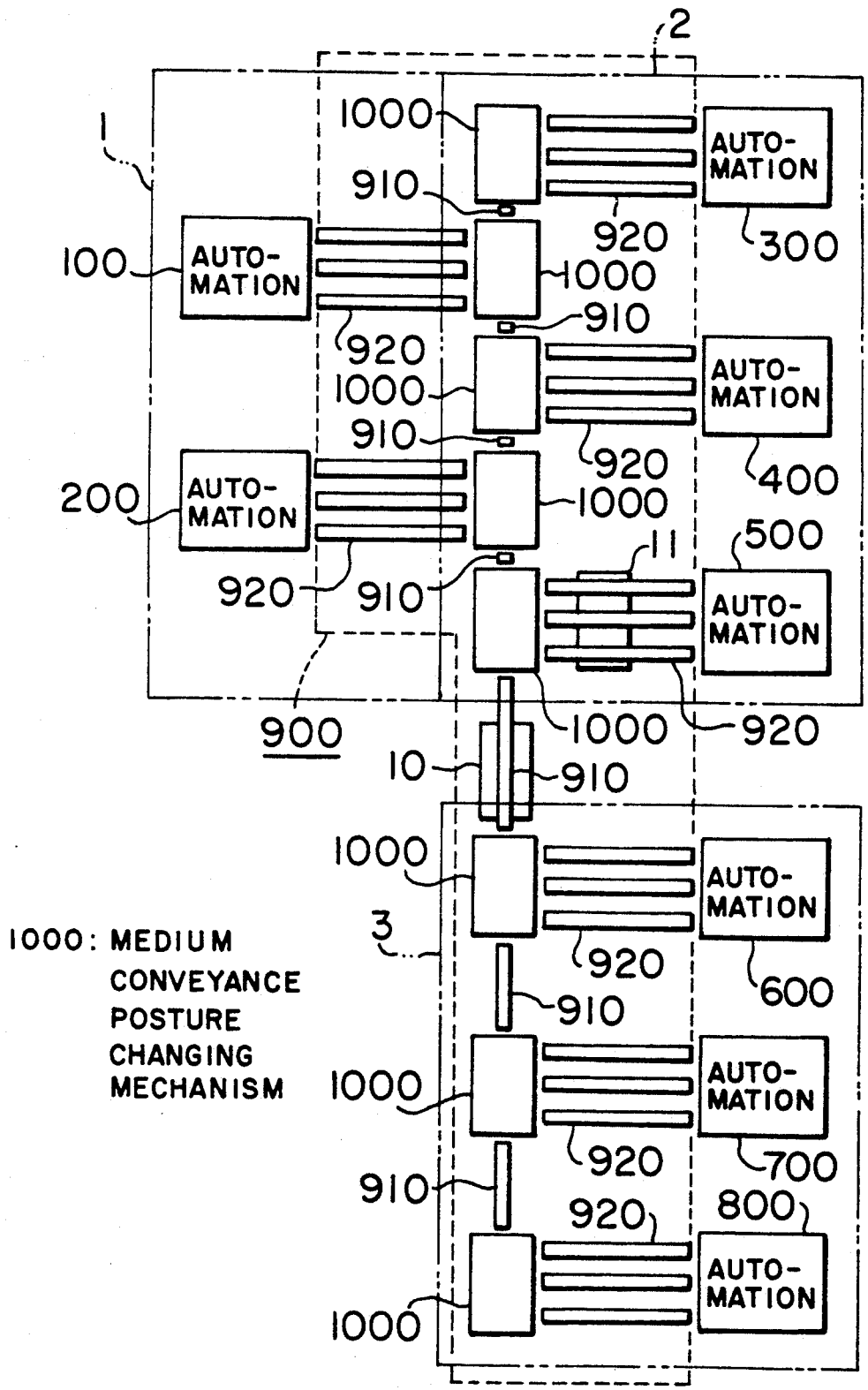
FIG. 3 is a plan view showing an embodiment of a sheet conveyor used in the FIG. 1 system.

FIG. 3 illustrates, in plan view form, an embodiment of the sheet conveying means 900. The sheet conveying means 900 shown in FIG. 3 comprises medium conveyance posture changing mechanisms 1000 for changing conveyance posture of a medium, a medium conveying means 920 for conveying a medium between each of the changing mechanisms 1000 and each of the automatons, and a medium conveying means 910 for conveying a medium between adjacent changing mechanisms 1000. Media conveyed by the medium conveying means 910 and 920 are indicated by 10 and 11, respectively. The medium 10 is conveyed in a direction coincident with the longitudinal length of the medium 10 (hereinafter referred to as longitudinal direction), and the medium 11 is conveyed in a direction coincident with the lateral length of the medium 11 (hereinafter referred to as lateral direction). As will be seen from details of the medium conveyance posture changing mechanism 1000 to be described later, the conveyance posture of a medium can be changed by the mechanism 1000 from posture shown at medium 10 to posture shown at medium 11 or vice versa. Since the conveyance posture changing can permit a medium being conveyed in the lateral direction to be conveyed in the longitudinal direction, the cross-sectional area of a conveyance path for the longitudinal direction conveyance can be smaller than that of a conveyance path for the lateral direction conveyance, and freedom of layout of the former conveyance path can be promoted.

Figure 4:
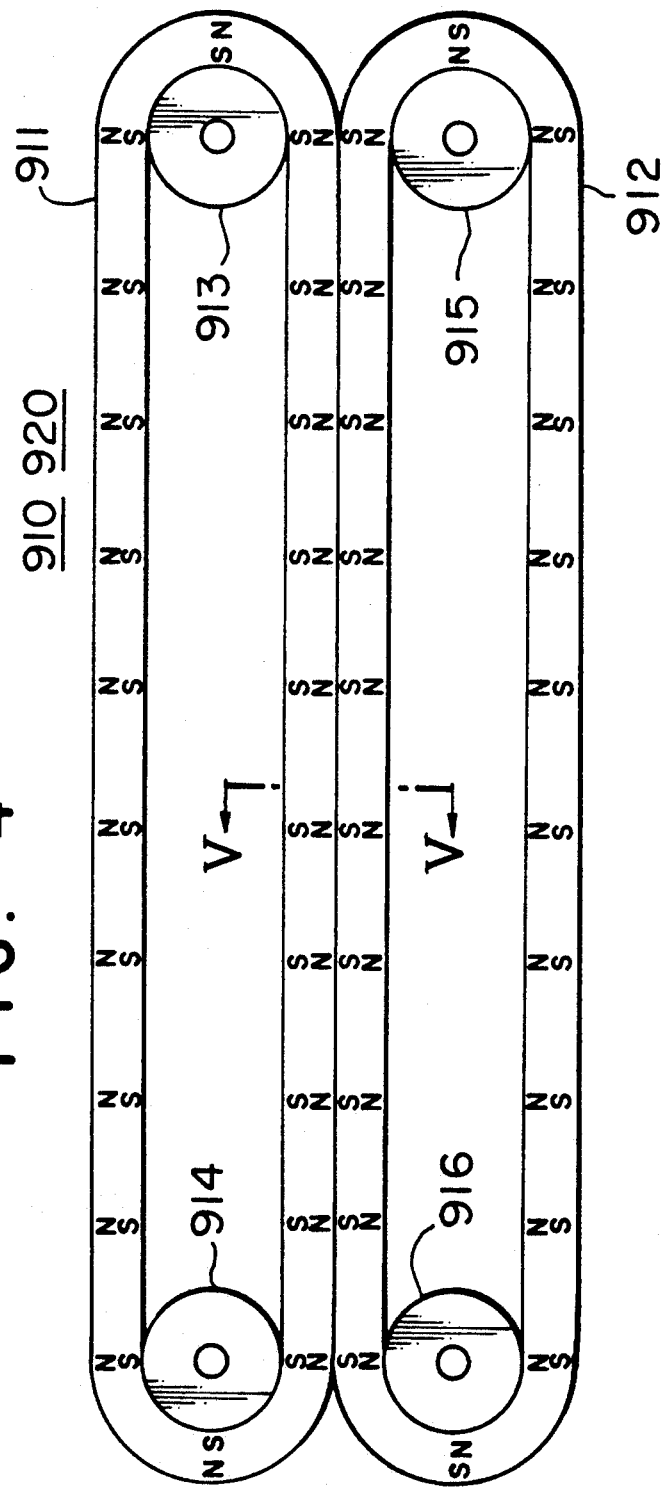
FIG. 4 is a side view showing an embodiment of a medium conveying means in FIG. 3.
Figure 5:
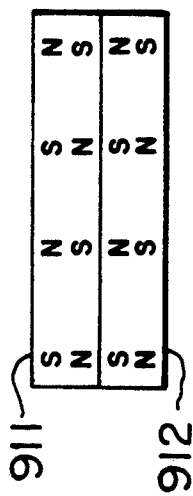
FIG. 5 is a sectional view taken on the line I—I of FIG. 4.

FIG. 4 illustrates an embodiment of the medium conveying means 910 or 920 in FIG. 3. Referring to FIG. 4, belts 911 and 912 are magnetized to produce sets of magnetic poles N and S at predetermined intervals in the width direction of each of the magnetic belts 911 and 912. FIG. 5 illustrates a section taken on the line I—I of FIG. 4, illustrating magnetizing these belts uniformly in their longitudinal directions. The magnetic belts 911 and 912 can be driven to rotate by means of pulleys 913, 914 and pulleys 915, 916, respectively, and a medium can be changed by opposing surfaces of the magnetic belts 911 and 912. Magnetic force due to magnetization of the magnetic belts 911 and 912 causes these belts to positively clamp a medium for conveyance.

Exemplarily, in FIG. 3, a set of magnetic belts 911 and 912 are used as the medium conveying means 910, and three sets of magnetic belts 911 and 912 are used as the medium conveying means 920. The number of sets of magnetic belts 911 and 912 may be changed suitably depending on the condition for conveyance of medium.

In this embodiment, the medium conveying means has been described as being formed of the magnetic belts but it may be constructed of non-magnetic belts or a combination of magnetic and non-magnetic belts.

An embodiment of the medium conveyance posture changing mechanism 1000 in FIG. 3 will now be described with reference to FIGS. 6, 7 and 8.

Figure 6:
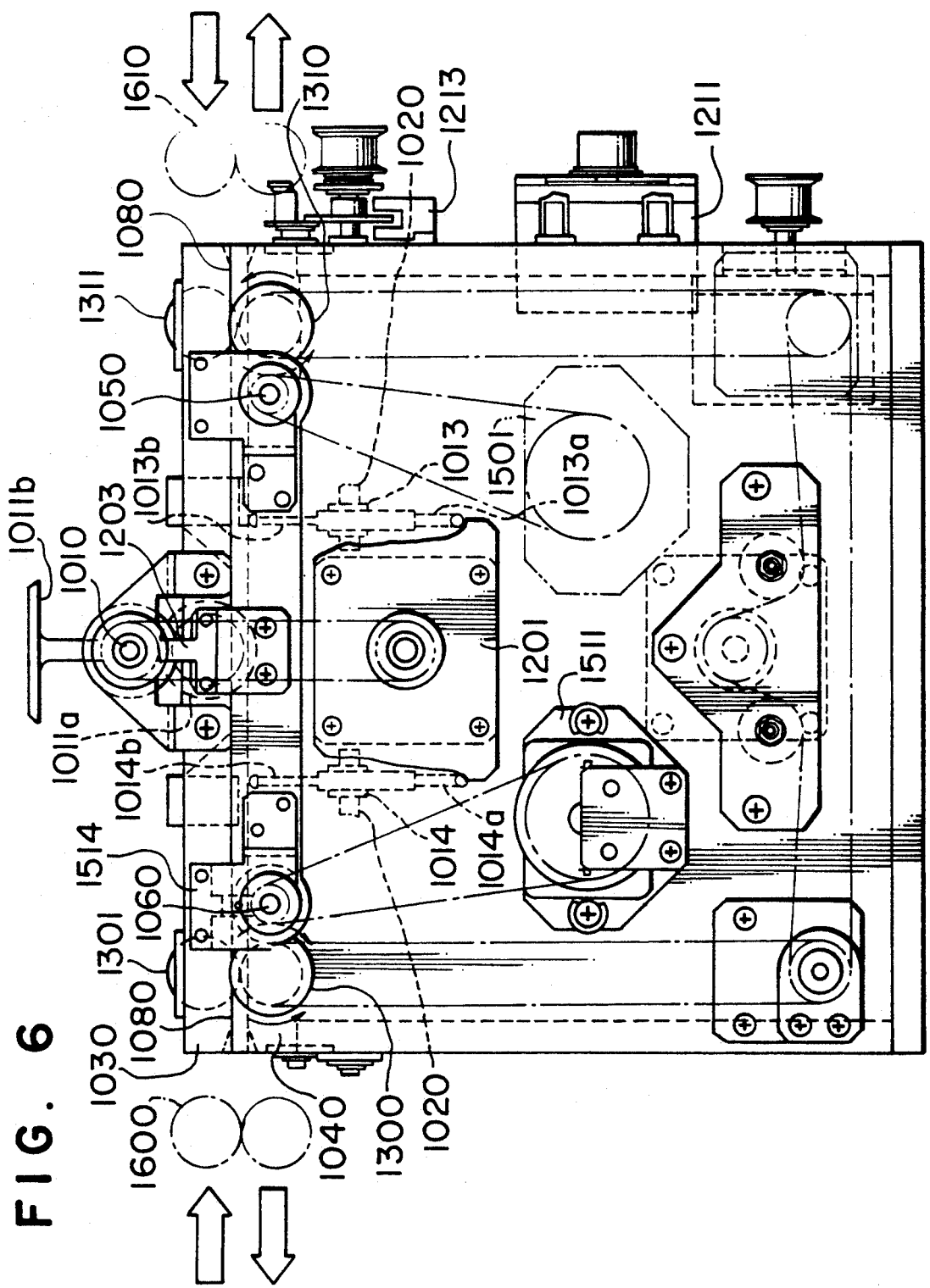
FIG. 6 is a front view showing an embodiment of a medium conveyance posture changing mechansim.
Figure 7:
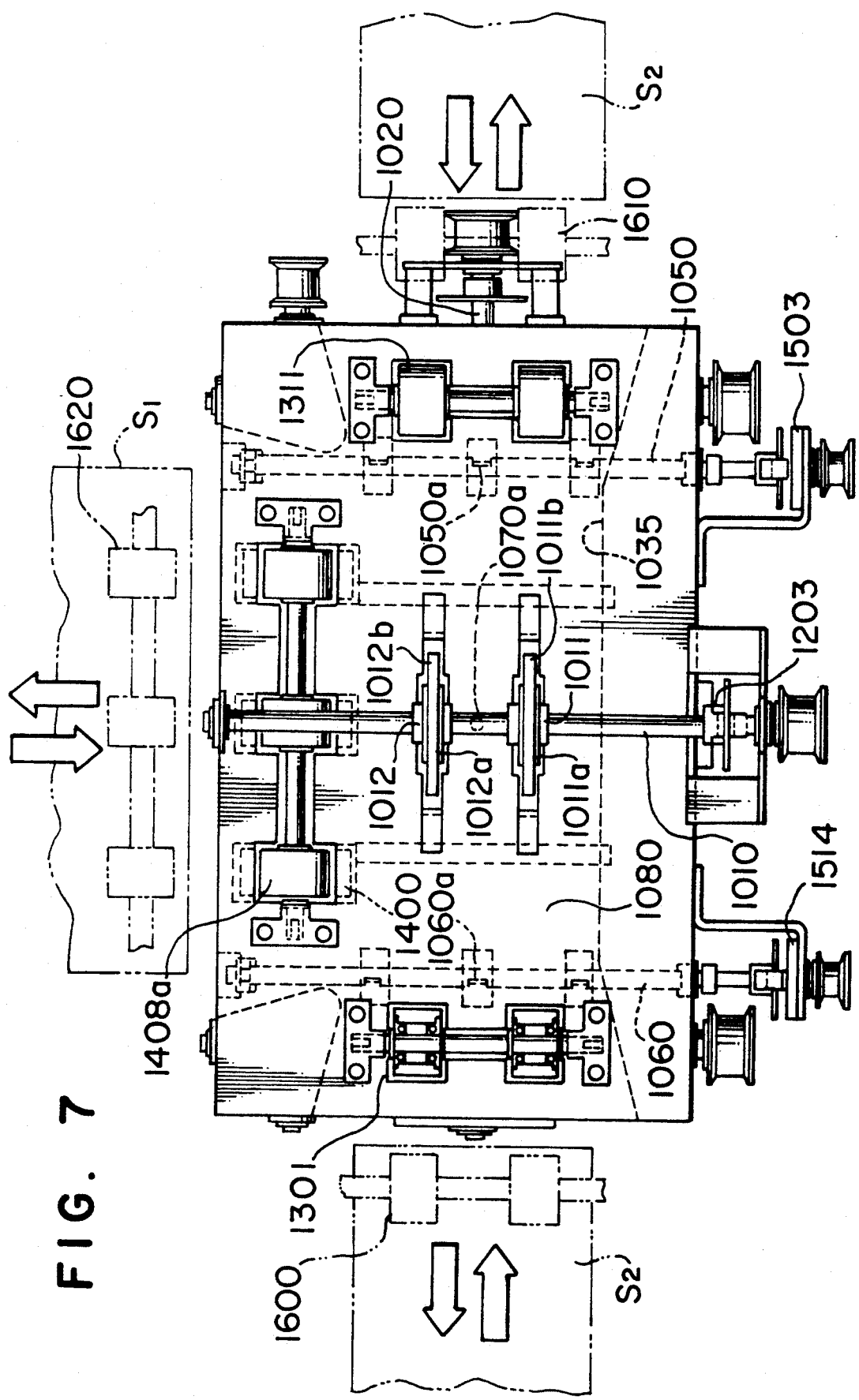
FIG. 7 is a plan view of FIG. 6.
Figure 8:
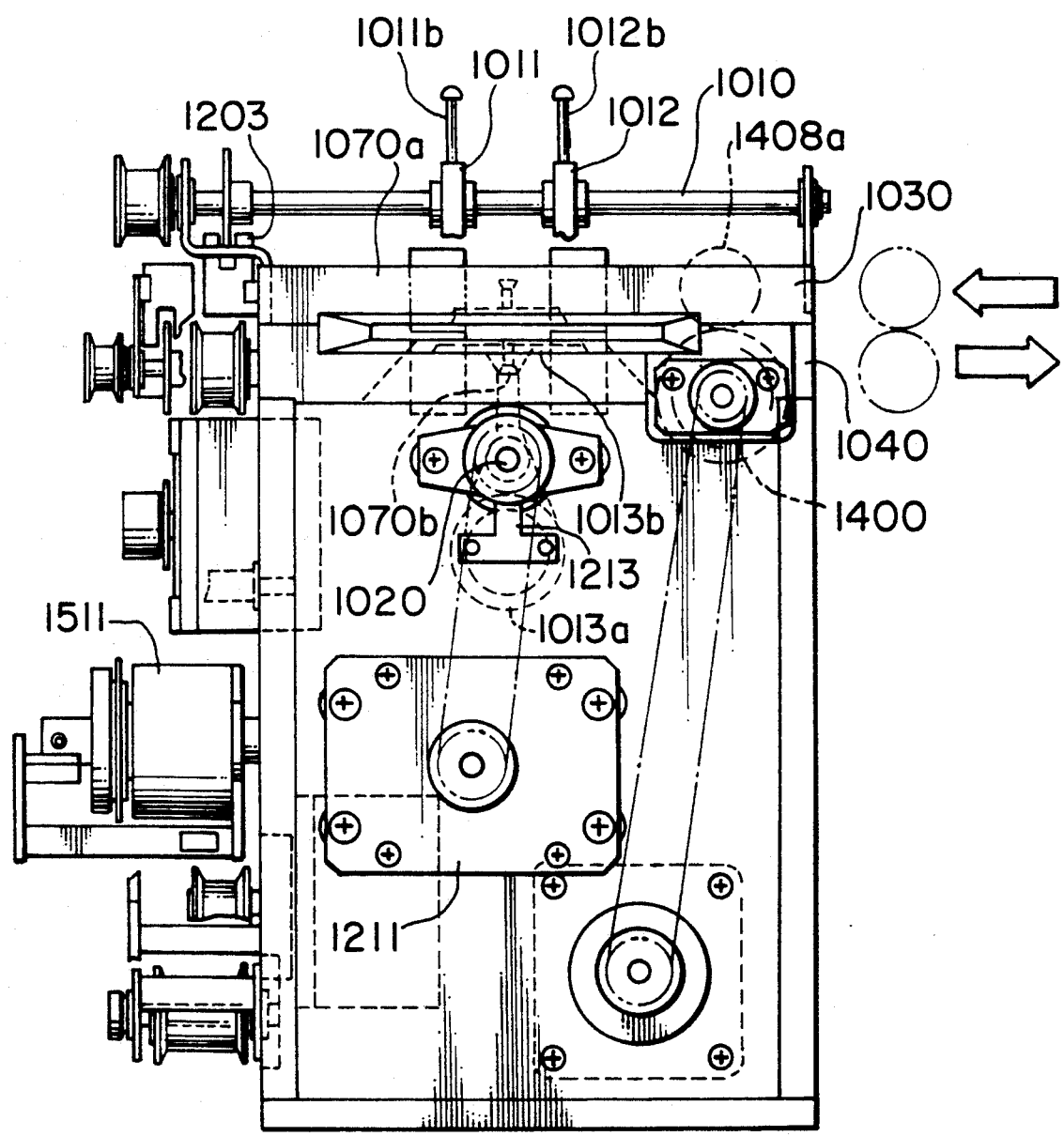
FIG. 8 is a side view of FIG. 6.

FIG. 6 is a front view of the medium conveyance posture changing mechanism, FIG. 7 is its plan view and FIG. 8 is its side view. The construction of the mechanism will first be described by referring to a conveyed medium in the form of a note.

As shown in FIGS. 6, 7 and 8, a frame for reception and transmission of a note comprises an upper plate 1030, a lower plate 1040 and a positioning member 1035. A shaft 1010 supported above the upper plate, and a shaft 1020 supported below the lower plate are orthogonal to each other. Two bosses 1011 and 1012 are fixed on the shaft 1010 at an interval. Mounted on the boss 1011 is a friction member 1011a and a shield member 1011b, and mounted on the boss 1012 is a friction member 1012a and a shield member 1012b. Similarly, bosses 1013 and 1014 are fixed on the shaft 1020 at an interval. Mounted on the boss 1013 is a friction member 1013a and a shield member 1013b, and mounted on the boss 1014 is a friction member 1014a and a shield member 1014b. Supported by the lower plate of the frame are shafts 1050 and 1060 which are orthogonal to the shaft 1020 and have stoppers 1050a and 1060a, respectively. Each of the four shafts 1010, 1020, 1050 and 1060 is rotatably supported by means of journal ball bearings.

At the center of the frame, sensors 1070a and 1070b are respectively provided in through-holes formed in the upper and lower plates.

Each of the friction members 1011a and 1012a, being integral with the shaft 1010 and rotatable along with it, is disposed in such a manner that when the shaft 1010 is positioned as shown in FIG. 6, the lowermost portion of each friction member overlaps with the upper surface of the lower plate 1040 of the frame, and similarly, each of the friction members 1013a and 1014a, being integral with the shaft 1020 and rotatable along with it, is disposed in such a manner that when the shaft 1020 rotates 180° from the position shown in FIG. 6, the uppermost portion of each friction member overlaps with the upper plate 1030 of the frame. This permits conveyance of a note. On the other hand, each of the shield members 1013b and 1014b, being integral with the shaft 1020 and rotatable along therewith, is disposed so as not to protrude into a note reception/transmission space 1080 when the shaft 1020 is postioned as shown in FIG. 6 and similarly, each of the shield members 1011b and 1012b, being integral with the shaft 1010 and rotatable along therewith, is disposed so as not to protrude into the note reception/transmission space 1080 when the shaft 1010 rotates 180° from the position shown in FIG. 6.

Each shield member 1011b, 1012b, 1013a or 1014b is made of a low friction material. When the friction members 1011a, 1012a, 1013a and 1014a retreat from the space 1080, the shield members 1011b, 1012b, 1013b and 1014b shield the holes through which the friction members protrude, in order for these holes not to hinder the smooth conveyance of a note through the space 1080.

The shafts 1010 and 1020 are driven forwardly or backwardly by means of pulse motors 1201 and 1211, respectively. The shafts 1010 and 1020 are respectively associated with sensors 1203 and 1213 for detecting stop positions of these shafts.

The shafts 1050 and 1060 are respectively driven by exciting rotary solenoids 1501 and 1511 forwardly or backwardly, so as to be held in either 0° position (at which respective stoppers 1050a and 1060a retreat from the reception/transmission space 1080) or 90° position (at which respective stoppers 1050a and 1060a protrude into the reception/transmission space 1080). Also, the shafts 1050 and 1060 are respectively associated with sensors 1503 and 1514 for detecting positions of these shafts.

Rollers 1301, 1311 and 1408a provided to the upper plate 1030 of the frame, as best seen in FIGS. 6 and 7, are all racing rollers which can be rotated by rollers 1300, 1310 and 1400 facing the rollers 1301, 1311 and 1408a, respectively.

The operation of this mechanism will now be described. In an operation to be described first, a note conveyed in the lateral direction is received and is then changed in its conveyance direction so as to be transmitted in the longitudinal direction. Referring to FIG. 7, the mechanism is initialized to set the direction of rotation of the shafts 1010 and 1020 as well as rollers. Each of the shafts 1010 and 1020 is stopped at a position where its friction members and shield members retreat from the reception/transmission space 1080, and the stoppers 1050a and 1060a are held in position to retreat from or protrude into the reception/transmission space 1080.

The conveying rollers 1400 and 1408a are rotated at constant speeds in a direction indicated by the solid arrow shown in FIG. 8. When a note is desired to be transmitted to the left in FIG. 7, the conveying rollers 1300, 1301 are 1310, 1311 and driven at constant speeds in a direction indicated by solid arrow shown in FIG. 6. The stopper 1060a retreats from the reception/transmission space 1080, and the stopper 1050a protrudes into the space 1080. Under this condition, a note $S_1$ being conveyed in the lateral direction is received by conveying rollers 1620. The fore edge of the note $S_1$ conveyed in the lateral direction is detected by the sensors 1070a and 1070b and the shaft 1020 is driven in the same direction as the conveyance direction of the note so that the note can be clamped by the friction members 1013a and 1014a and the inner surface of the upper plate 1030 of the frame before the fore edge of the note reaches the positioning member 1035. After the note is clamped, the rotation speed of the shaft 1020 is decreased whereby the rotation of the friction members 1013a and 1014a brings the fore edge of the note into engagement with the positioning member 1035 at a low speed. Thereafter, the rotation of the shaft 1020 is accelerated to retreat the friction members 1013a and 1014a from the space 1080, and the shaft 1020 is then stopped at a predetermined position. The note is thus positioned correctly and remains in the space 1080. Subsequently, the shaft 1010 is driven in the transmission direction of the note so that the note is clamped by the friction members 1011a and 1012a, now in rotation, and the inner surface of the lower plate 1040 of the frame and conveyed to the rollers 1300 and 1301. These rollers then deliver the note out of the mechanism and thereafter the shaft 1010 stops at the predetermined position. Under this condition, the mechanism is ready for receiving the next note. Lefthand conveying rollers 1600 are driven to convey the delivered note.

If the note is desired to be transmitted to the right in FIG. 7, the conveying rollers 1300, 1301 and 1310, 1311 are driven in the opposite direction, the stopper 1060a is caused to protrude into the space stopper 1060a is caused to protrude into the space 1080 and the shaft 1010 is driven in the opposite direction. In this case, righthand conveying rollers 1610 are driven to convey the note.

In an operation to be described below, a note $S_2$ conveyed in the longitudinal direction is received and is then changed in its conveyance direction so as to be transmitted in the lateral direction. As an example, it is assumed that in FIG. 7 a note $S_2$ conveyed in the longitudinal direction is received by the lefthand conveying rollers 1600 and transmitted to the upward rollers 1620. The conveying rollers 1300, 1301 and 1310, 1311 are driven at constant speeds in a direction indicated by dotted arrow in FIG. 6, the conveying rollers 1400 and 1408a are driven at constant speeds in a direction indicated by dotted arrow in FIG. 8, the stopper 1050a is caused to protrude into the space 1080, and the stopper 1060a retreats from the space 1080 so as to be ready for receiving a note. The fore edge of a note being conveyed in the longitudinal direction is detected by the sensors 1070a and 1070b, and the shaft 1010 is driven in the same direction as the conveyance direction of the note so that the note can be clamped by the friction members 1011a and 1012a and the inner surface of the lower plate 1040 of the frame before the fore edge of the note reaches the stopper 1050a. After the note is clamped, the rotation speed of the shaft 1010 is decreased to bring the fore end of the note into engagement with the stopper 1050a at a low speed. Thereafter, the rotation of the shaft 1010 is accelerated to retreat the friction members from the space, and the shaft 1010 is then stopped at a predetermined position. The note is thus positioned correctly and remains in the space 1080. Subsequently, the shaft 1020 is driven in the transmission direction of the note so that the note is clamped by the friction members 1013a and 1014a, now in rotation, and the inner surface of the upper plate 1030 of the frame and conveyed to the rollers 1400 and 1408a. These rollers then deliver the note out of the mechanism and thereafter the shaft 1020 stops at the predetermined position. Under this condition, the mechanism is ready for receiving the next note.

When a note conveyed in the longitudinal direction is received and then transmitted also in the longitudinal direction without undergoing direction change, the mechanism operates as follows. As an example, description will be given on the assumption that in FIG. 7, a note is received from the left and transmitted to the right. In a converse case, the direction of rotation of the conveying rollers and shaft 1010 is simply reversed. The conveying rollers 1300, 1301 and 1310, 1311 are driven at constant speeds in the direction indicated by dotted arrow in FIG. 6, and the stoppers 1050a and 1060a, both retreat from the space 1080 so as to be ready for receiving a note. The fore edge of the note is detected by the sensors 1070a and 1070b and the shaft 1010 is rotated in the following manner. More particularly, the instant that the note is clamped by the friction members 1011a and 1012a and the inner surface of the lower plate of the frame, the shaft 1010 is accelerated to the same speed as the conveyance speed of the note, and the accelerated speed is maintained for transmission of the note; and thereafter the shaft 1010 is stopped at a predetermined position when the friction members have retreated from the space. Under this condition, the mechanism is ready for receiving the next note.

As described above, in the present mechanism, by properly selecting the rotation direction of the shafts with friction members disposed orthogonally to each other and the conveying rollers as well as the stopper position, conveyance posture changing can be realized easily for changing the posture of the medium from conveyance in the lateral direction to that in the longitudinal direction or vice versa. In the conveyance in the longitudinal direction, the medium can be received and transmitted in any selected one of the right and left directions.

In the present embodiment the two orthogonal shafts are respectively disposed above and below the reception/transmission space 1080, but this disposition of these shafts is not limitative and for example, the two orthogonal shafts may both be disposed above the space 1080 or below it. The paths for reception and transmission of a note are laid in three directions in the present embodiment but the number of directions of the paths can easily be expanded to four by replacing the positioning member 1035 with a movable stopper. Further, in the present embodiment, the friction member is in the form of a ring but it may be replaced with a rubber roller which is partly cut away and which can produce a sufficient stroke of conveyance of a note.

The operation of the group supervisory system will now be described by way of example of medium conveyance between the automaton 100 in the first corner 1 and the automaton 300 in the second corner 2.

When the automaton 300 is utilized so that media are received and temporarily stored in the buffer box 301, and a request for conveying the media to the automaton 100 is transmitted to the control means 4 through the communication means 5; the control means 4 transmits to the sheet conveying means 900, through the communication means 5, a command for preparing a route through which the media are transmitted from automaton 300 to automaton 100. In response to the command from the control means 4, the sheet conveying means 900 acts on the medium conveyance posture changing mechanism 1000 to set the rotation direction of the individual conveying rollers, the stopper position and the rotation direction of the medium conveying means 910 and 920. The automaton 100 is so set as to cause its buffer box 101 to receive the media. After the completion of setting, the individual parts are sequentially actuated so as to be ready for conveying the media from automaton 300 to automaton 100 and then inform, through the communication means 5, the control means 4 that the actuation has been completed. Receiving a completion signal, the control means 4 transmits to the automaton 300 through the communication means 5 a command which causes the buffer box 301 to transmit the media to the sheet conveying means 900. Receiving the command, the automaton 300 sequentially transmits to the sheet conveying means 900 the stored media one by one. Thus, the transmitted media are received and stored in the buffer box 101 of automaton 100 through the medium conveying means 910, 920 and medium conveyance posture changing mechanism 1000. When all of the media stored in the buffer box 301 of automaton 300 have been transmitted, the automaton 300 transmits to the control means 4 information indicative of completion of transmission of the media. The control means 4 waits for receiving from the automaton 100 information indicative of completion of reception of the media. When the last medium transmitted from the automaton 300 is received by the buffer box 101, the automaton 100 transmits a reception completion signal to the control means 4. Upon receipt of this signal, the control means 4 determines that all of the media transmitted from the automaton 300 are received by the automaton 100 and transmits to the automatons 100, 300 and sheet conveying means 900 a signal for stopping mechanisms which have been actuated for conveyance of the media, and the mechanisms are stopped to terminate the medium conveyance operation from automaton 300 to automaton 100.

The converse conveyance of media stored in the buffer box 101 of automaton 100 to the automaton 300 can be done in a similar manner to the above.

Conveyance of media between other automatons can also be done in a similar manner.

To ensure automatic conveyance of media between automatons throughout the group supervisory system even in the event that, during conveyance of media between two automatons, another automaton issues a medium conveyance request, the control means 4 may be designed to perform such a control operation that after completion of a conveyance operation currently processed, the next conveyance operation is permitted.

Other modes of operations are achievable similarly including utilization of only part of the group supervisory system shown in FIGS. 1 and 2 such as utilization of automatons located in only one corner or utilization of automatons located in only two corners. Commands used for these modes may be inputted from the control means 4 or alternatively from a control means not shown which is a host of the control means 4.

Since in accordance with the foregoing embodiment media can be conveyed automatically between respective automatons, a necessary amount of media can be conveyed, when necessary, in order that media can be distributed effectively.

Further, two corners between which the amount of media to be conveyed is maximal can be laid close to each other and the length of the sheet conveying means 900 can be shorter between the two corners than between other corners, thereby increasing the amount of media to be handled by the group supervisory system to improve system efficiency.

Thanks to the medium conveyance posture changing mechanism, included in the sheet conveying means, capable of freely changing the conveyance posture of medium, the conveying path can be reduced in size and flexibility of path layout can be increased to advantage. Preferably, the media can steadily be clamped and conveyed by the magnetized belts to improve reliability of the conveyance system.

The buffer box provided in each automaton can separate the processing of each automaton per se from the processing for conveyance of media between automotons and therefore service to customers and efficiency of the group supervisory system can both be improved.

An embodiment of a method of utilizing the group supervisory system according to the invention will now be described with reference to FIGS. 9 to 19.

Figure 9:
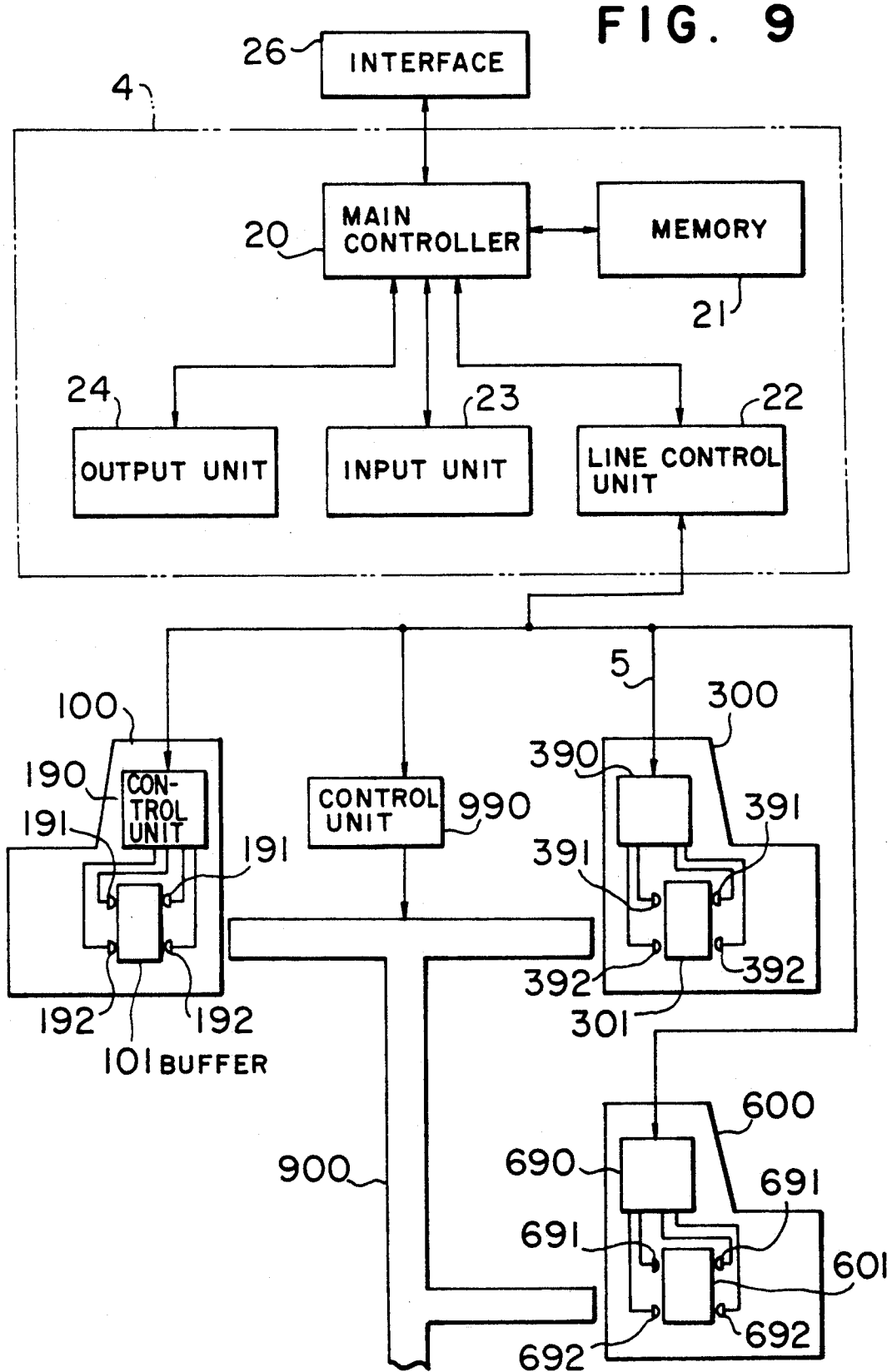
FIG. 9 is a block diagram useful to explain an embodiment of a method of utilizing the system according to the invention.

As shown in FIG. 9, the control means 4 comprises a main controller 20, a memory 21, a line control means 22, an input means 23 and an output means 24.

The automatons 100, 300 and 600 are interconnected together by the sheet conveying means 900 which aligns and conveys, one by one, media necessary for utilization of each automaton. The automatons 100, 300 and 600 are respectively provided with buffer boxes 101, 301 and 601 each operable to temporarily store media such as notes which undergo deliver/reception between each automaton and the sheet conveying means 900. Each of the automatons is controlled by control means 190, 390 or 690 provided in each automaton. The amount of media in each buffer box 101, 301 or 601 is detected by detection means 191 and 192, 391 and 392 or 691 and 692 provided in association with each buffer box. Each of the detection means 191, 391 and 691 is adapted to detect that the amount of media is large and each of the detection means 192, 392 and 692 is adapted to detect that the amount of media is small.

The sheet conveying means 900 is controlled by control means 990. The control means 4 is connected to other control means 190, 390, 690 and 990 by the communication means 5 through the line control means 22 so as to perform information change.

The control means 4 is connected to another control means (not shown) through the interface 26.

Stored in the memory 21 is information to be described below. In accordance with the number of media, the media are expressed by a code j as shown in FIG. 10. Changes in the amount of media at the rate of predetermined times a day [herein the date is described by "X" (month) "Y" (day)] are expressed in a pattern P as shown in FIG. 11 by utilizing the code j. More specifically, the number n of media at time $t_2$ on $Y_1$ day of $X_2$ month is larger than $n_1$ and smaller than $n_2$ and FIG. 1 tells that the code j is 2. At other times on the same day, the amounts of media are similarly expressed by the code j to obtain a pattern P having suffix defined by serial values of the code j corresponding to times $t_1$ to $t_e$.

The same serial values of the code j lead to the same pattern P regardless of the data. Patterns P corresponding to dates of year are stored in the memory 21. If a plurality of kinds of media are used, the pattern P defined for each kind of media is stored.

Also stored in the memory 21 are code tables including a weather condition code $\alpha$ as shown in FIG. 12, a business trend condition code $\beta$ as shown in FIG. 13, a regional trend condition code $\gamma$ as shown in FIG. 14, a management policy condition code $\delta$ as shown in FIG. 15 and a day of week and holiday condition code K as shown in FIG. 16.

Values of coefficient in each code table can be modified automatically during utilization or changed by means of the input means 23. For example, automatic modification may be effected on the ground that if the total amount of media increases year by year, the coefficient is increased to conform to the change but conversely if the total amount of media decreases, the coefficient is decreased correspondingly.

Figure 17:
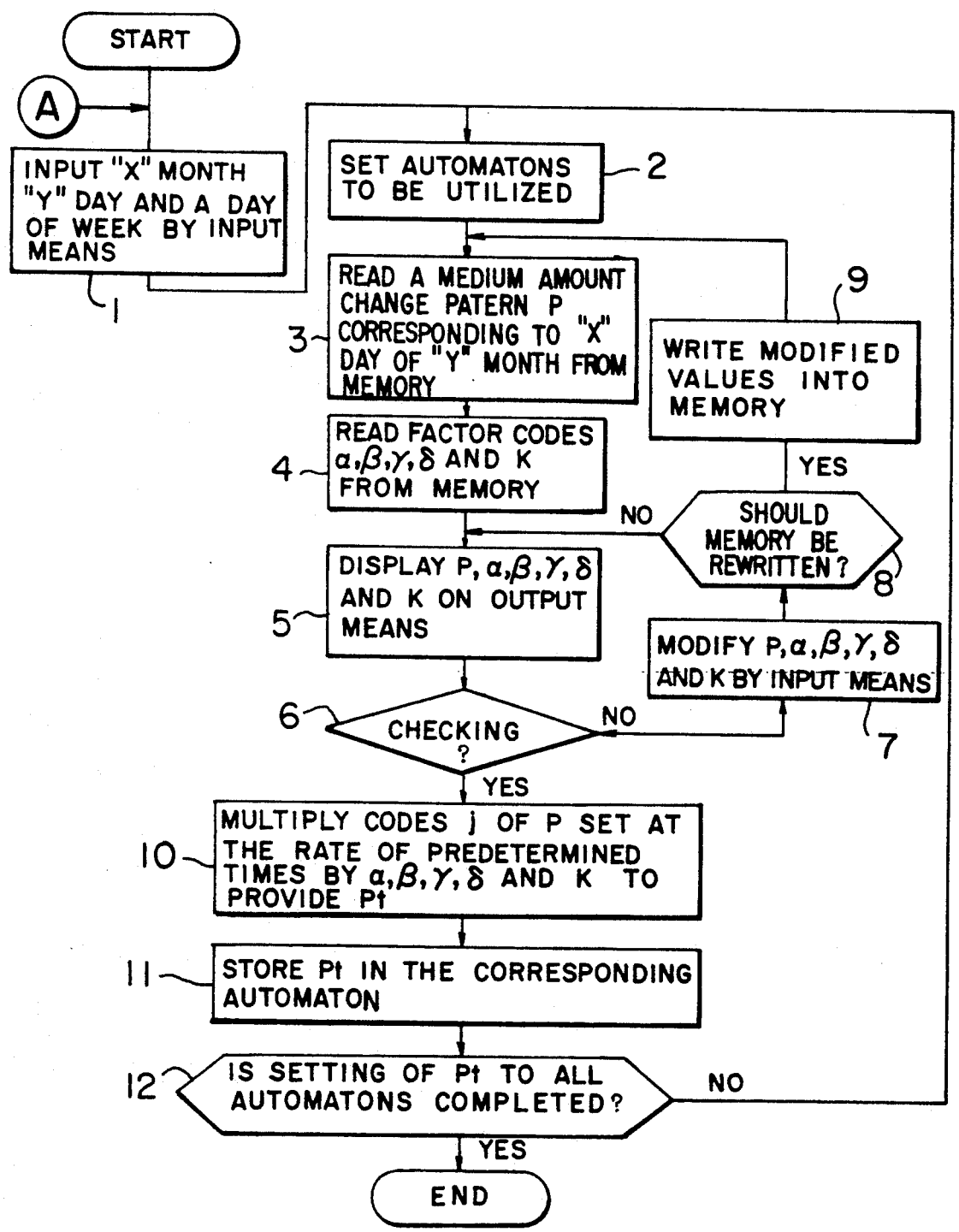
FIGS. 17 to 19 are flow charts showing the operation of the group supervisory system according to the invention.
Figure 18:
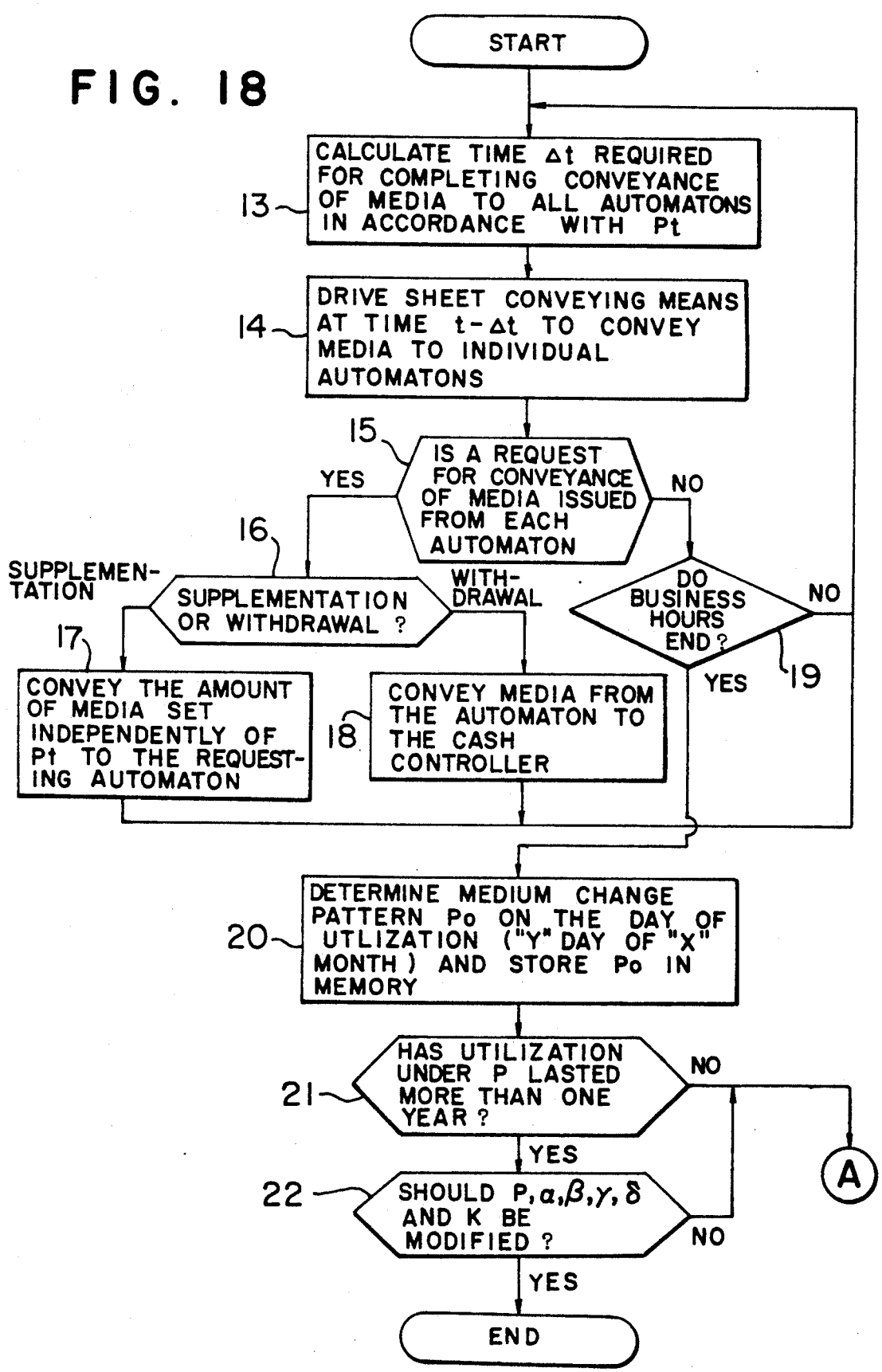
Figure 19:
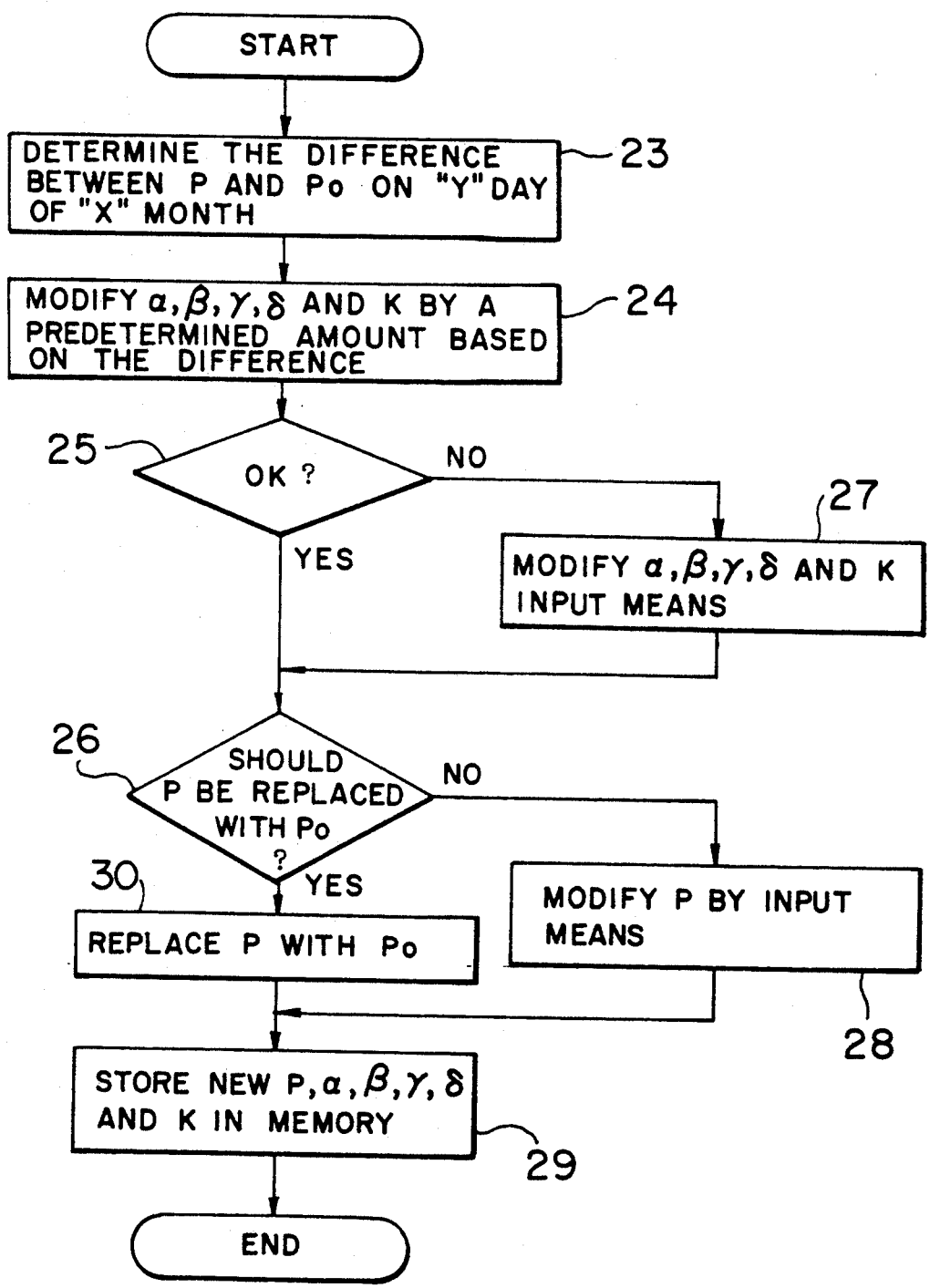

Flow charts shown in FIGS. 17, 18 and 19 are illustrative of the operation of the group supervisory system of the present invention. The following description will be given on the assumption that the medium is a note and the automaton 100 is a cash controller, but obviously this assumption is not limitative. Here, conveyance of a note from other automatons 300 and 600 to the automaton 100 is called "supplementation" and conveyance of a note from other automatons 300 and 600 to the automaton 100 is called "withdrawal".

FIG. 17 particularly shows a flow chart of initialization for start of utilization. In step (1), a data of utilization described by X (month) and Y (day) and a day of week is inputted by means of the input means 23. In step (2), automatons to be utilized are set by means of the input means 23. In step (3), a pattern P corresponding to Y day of X month stored in the memory 21 is read out. If a plurality of kinds of media are used, a pattern for each kind of media is read out. Although a processing for one kind of media will be explained herein, a processing for a plurality of kinds of media may be carried out in a similar way. In step (4), relevant values of factor codes $\alpha$, $\beta$, $\gamma$, $\delta$ and K are read out of the memory 21. In step (5), the pattern P and the values of $\alpha$, $\beta$, $\gamma$, $\delta$ and K are displayed on the output means 24. In step (6), the display is checked and if any inconvenience is found, the procedure proceeds to step (7) where p, $\alpha$, $\beta$, $\gamma$, $\delta$ and K are modified by means of the input means 23. It is then decided in step (8) whether previous data stored in the memory 21 should be rewritten into the modified values. If rewriting of the previous data stored in memory 21 is not determined, the procedure proceeds to the step (5). Conversely, if rewriting of the previous data stored in memory 21 is determined, the procedure proceeds to step (9) where the modified values are stored into the memory 21. If in the check step (6) no inconvenience is found, the procedure proceeds to step (10) where data of the pattern P which are set at the rate of predetermined times are multiplied by the factors $\alpha$, $\beta$, $\gamma$, $\delta$ and K to provide a pattern Pt practically utilized. In step (11), the pattern Pt is stored in the memory 21. In step (12), it is decided whether setting of the pattern Pt to all of the automatons to be utilized is completed. If not completed, the procedure proceeds to the step (2) and other automatons are set but if completed, the initialization ends and the procedure proceeds to a flow chart shown in FIG. 18. A terminal Ⓐ in FIG. 17 connects to the same terminal in FIG. 18.

Referring to FIG. 18, in step (13), time $\Delta t$ required for completing conveyance of media to all automatons in accordance with the pattern Pt is calculated and in step (14), the sheet conveying means 900 is driven at time t-$\Delta t$ to sequentially convey media from the automaton 100 to the automatons 300 and 600 in order that the amount of media stored in the automatons 300 and 600 at time t measures a required amount. In step (15), it is checked whether each automaton issues a request for conveyance of media. This request is represented by signals from the medium detection means 391 and 392 associated with the buffer box 301 of the automaton 300 and signals from the medium detection means 691 and 692 associated with the buffer box 601 of the automaton 600. The former signals are transmitted to the main controller 20 through the control means 390, communication means 5 and line control means 22 and detected by the main controller 20 and similarly, the latter signals are transmitted to the main controller 20 through the control means 690, communication means 5 and line control means 22 and detected by the main controller 20. When the automatons issue the request for media, the procedure proceeds to step (16) where it is checked which type of conveyance "supplementation" or "withdrawal" is requested. In this checking, generation of signals from the medium detection means 392 and 692, which indicate that the amount of media stored in the buffer boxes 301 and 601 is small, leads to supplementation. In this case, in step (17), the amount of media is set independently of the pattern Pt and conveyed from the automaton 100 by means of the sheet conveying means to the requesting automaton, thereby completing supplemental operation. Generation of signals from the medium detection means 391 and 691 in the step (16) leads to withdrawal and the procedure proceeds to step (18) where because of the buffer boxes 301 and 601 of the automatons being filled with media, media stored in the buffer box of the automaton issuing the signal are withdrawn to the automaton 100 by way of the sheet conveying means 900. After completion of processings in the steps (17) and (18), the procedure proceeds to the step (13) and then continues.

If in the step (15) no medium request signal is issued from each automaton, the procedure proceeds to step (19) where it is decided whether business hours end. Within business hours, the procedure proceeds to the step (13) and then continues. If the step (19) decides that business hours end, the procedure proceeds to step (20).

In the step (20), changes in the amount of media on the day of utilization (Y day of X month) are formulated into a pattern Po in accordance with the code shown in FIG. 10 and the pattern Po is stored in the memory 21. In step (21), it is decided whether utilization under the pattern P has lasted more than one year. If answer is NO, the procedure proceeds to the step (1) in FIG. 17 which manages utilization on the next day. A terminal Ⓐ in FIG. 18 connects to the same terminal in FIG. 17. If answer is YES in the step (21), the procedure proceeds to step (22) where it is checked whether the pattern P and the factors $\alpha$, $\beta$, $\gamma$, $\delta$ and K should be modified. If no modification is needed, the procedure returns to the step (1) in FIG. 17. If modification is needed, the utilization processing ends and the procedure shifts to a modification processing flow as shown in FIG. 19.

Through a flow chart of FIG. 19, the pattern P and the factors $\alpha$, $\beta$, $\gamma$, $\delta$ and K are modified. In step (23), the patterns P and Po for Y day of X month are read out of the memory 21 and a difference between the two patterns is determined. In step (24), the factors α, β, γ, δ and K are modified by predetermined amounts based on the thus determined difference. In step (25), the modification results are checked and if inconvenient, the factors α, β, γ, δ and K are further modified by means of the input means 23 in step (27) and then the procedure proceeds to step (26). If no inconvenience occurs in the step (25), the procedure proceeds directly to the step (26). In the step (26), it is decided whether the pattern P should be replaced with the pattern Po. If the pattern P should not be replaced with the pattern Po, the procedure proceeds to step (28) where the pattern P is modified by means of the input means 23 and then to step (29). If replacement of the pattern P with the pattern Po is determined in the step (26), the pattern P is replaced with the pattern Po in step (30). In the step (29), the new pattern P and the factors α, β, γ, δ and κ are stored in the memory 21, thus completing the modification processing.

Thereafter, the procedure returns to the step (1) in FIG. 17 where utilization on the next day starts.

In accordance with the present embodiment, automatic supplementation and withdrawal can be effected between the automaton 100 at the center and other automaton 300 and 600 and besides, each automaton can be operated in advance in accordance with a predictive value Pt determined by the pattern P and factors α, β, γ, δ and κ. This ensures conveyance of the necessary amount of media at necessary times to thereby improve utilization efficiency of media and saving of clerk.

By checking the pattern P and factors α, β, γ, δ and κ every year, updated prediction can be insured to advantage.

In the present embodiment, for example, a date and a day of week are inputted by means of the input means 23 but input operation may be omitted using a built-in perpetual calendar.

According to the utilization method described as above, media required by each automaton can automatically be conveyed at good timings at the rate of predetermined times and advantageously the media can be utilized with high efficiency. Further, since time required for conveyance can be predicted, medium conveyance can be carried out without causing handling of the automatons to pause and service to customers can be improved. In addition, because of automatic conveyance, labor for medium conveyance can be saved. Moreover, the pattern indicative of the necessary amount of media can be modified automatically and therefore automatic operation of the system can be insured.

Figure 20:
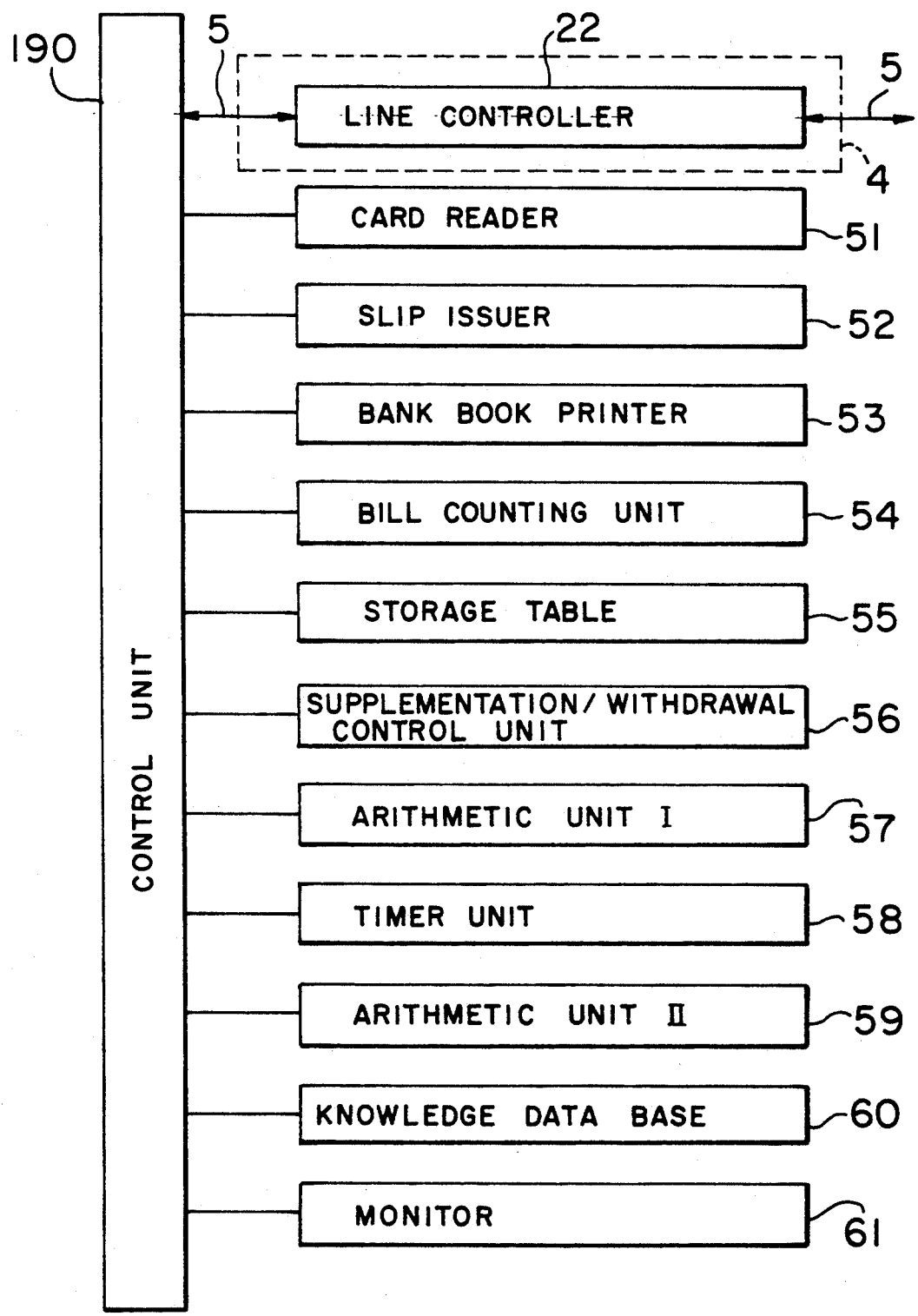
FIG. 20 is a block diagram schematically illustrating an embodiment of an automatic teller machine according to the invention.
Figure 21:
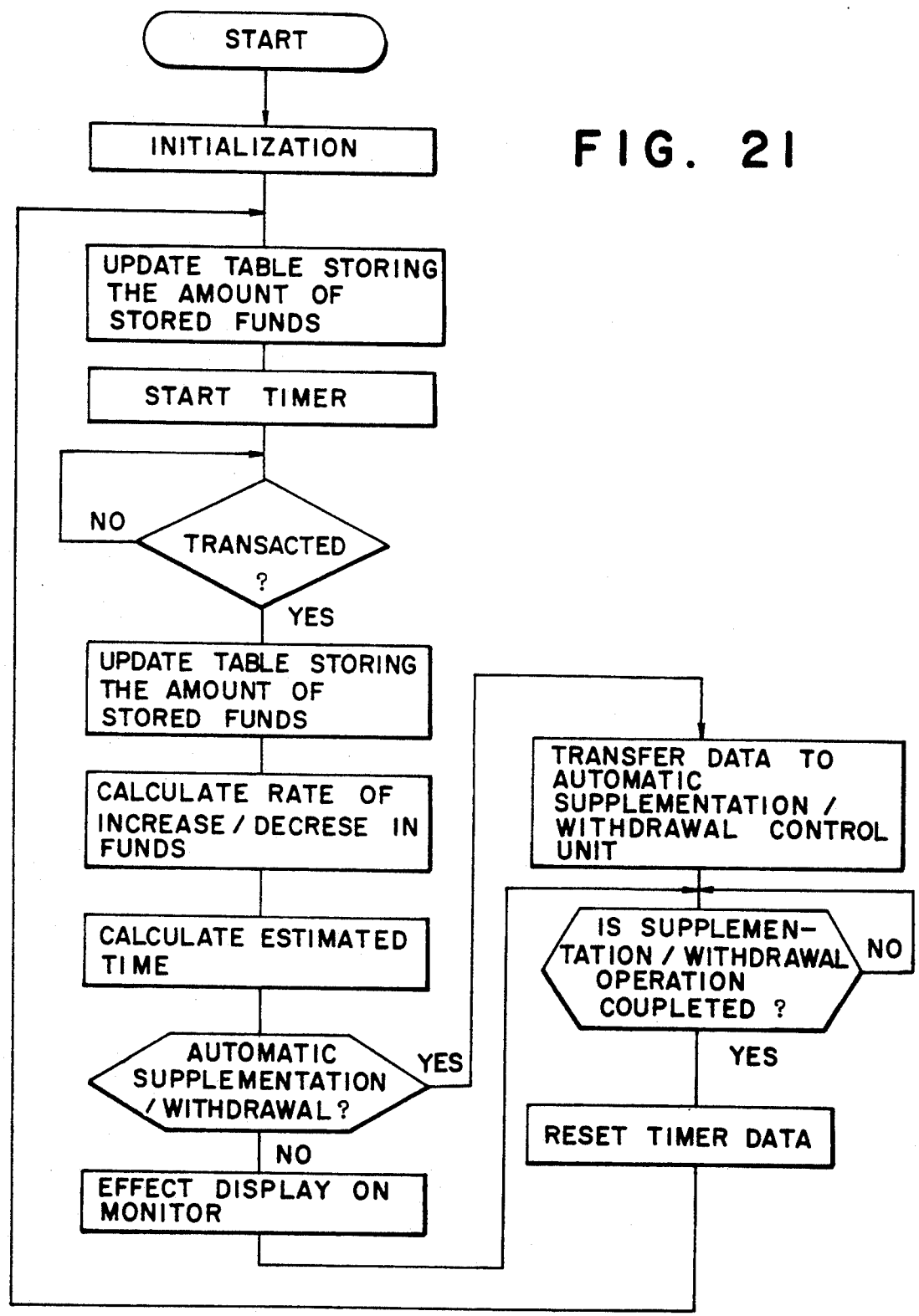
FIG. 21 is a flow chart useful to explain the operation of supplementation and withdrawal of notes in the FIG. 20 embodiment.

FIG. 20 illustrates the construction of an embodiment of an automated teller machine according to the invention and FIG. 21 shows an embodiment of a method of utilizing the machine. The machine is an automaton for customer and as shown in FIG. 20, it comprises a card reader 51, a slip issuer 52, a bank book printer 53 and other units necessary for supplementation and withdrawal operation of notes and controlling the operation. All of the units are governed by a control means 190. In some applications, the control means 190 may be controlled from the outside by way of a line controller 22. In manual mode by the clerk, the automaton is controlled through a note counting unit 54 and in automatic supplementation and withdrawal mode, it is controlled through the note counting unit 54 and a dedicated supplementation/withdrawal control unit 56.

A storage table 55 is a memory for storing information necessary for ordinary deposition and payment transaction, i.e., personal identification number and balance of customers as well as the amount of notes stored in the automaton which changes with time.

An arithmetic unit I 57 calculates the rate of change of increase/decrease in notes on the basis of data in a timer unit 58 and balance of transaction data and transfers the calculation results to an arithmetic unit II 59.

The arithmetic unit II 59 takes into account empirical values based on the increase/decrease rate of notes and a knowledge data base 60 to estimate the time taken for a state to occur wherein fill-up or excessively small residual amount is detected. By storing the estimated time as experience in the knowledge data, accuracy of the estimated time can be improved.

A monitor 61 is adapted to display the estimated required time.

From the information displayed on the monitor 61, the clerk can know the operation condition of a plurality of automatons and proceed with processings in advance in consideration of the time required for supplementation and withdrawal of notes, whereby even when the required times displayed on the plurality of automatons are substantially identical to each other, pause of transaction due to delay in action of the clerk can be avoided.

When the present embodiment is applied to automatic supplementation and withdrawal, data of the estimated required time from the arithmetic unit II 59 is transferred to the supplementation/withdrawal control unit 56. In response to a command from the supplementation/withdrawal control unit 56, the control means 190 transmits necessary information to a mask controller (not shown) through the line controller 22.

In this manner, the supplementation/withdrawal operation of notes can be carried out automatically.

An example of supplementation and withdrawal operation of notes performed with the machine of FIG. 20 will now be described with reference to a flow chart shown in FIG. 21.

When funds are loaded on individual automatons by the clerk or by means of a known automatic supplementation/withdrawal mechanism, each automaton is automatically initialized and the amount of funds stored in each automaton is settled.

Concurrently with start of utilization, the built-in timer unit starts counting. The arithmetic unit refers to transaction data and timer data to calculate a rate of change of increase/decrease in funds within unit time each time that deposition or payment is transacted and transfers the calculation results to an estimation means. On the basis of the calculation results and data base such as knowledge base, the estimation means estimates the time taken for a state to occur wherein fill-up or excessively small residual amount is reached and the estimated required time is displayed on the monitor. In the case of automatic supplementation and withdrawal, the estimation results are sent to the control circuit and automatic processing is carried out as necessary.

As described above, the present embodiment can be applied to not only supplementation and withdrawal of notes manually carried out by the clerk but also a group supervisory system for automatic supplementation and withdrawal which, for example, systematically controls individual automatons including a cashier note controller in a bank business shop.

Further, since operation conditions of a plurality of automatons such as ATM's can be determined sequentially to forecast occurrence of the state wherein supplementation or withdrawal of notes is needed, delay of transaction due to delay in action of the clerk, which often occurs when the clerk contacts or negotiates with many customers in a cash corner installed with a plurality of automatons, can be avoided.

Moreover, the automaton such as ATM can be utilized with the necessary minimum amount of funds stored therein.

As is clear from the above, in accordance with the present embodiment, service to customers can be improved and in addition, utilization efficiency of funds can be improved remarkably.

We claim:

1. A group supervisory system for controlling a transaction system at a transaction location, comprising:
   a first transaction machine located at a first area of said transaction location where a clerk operates said first transaction machine for controlling transaction media including bills;
   a second transaction machine located at a second area of said transaction location where customers operate said second transaction machine;
   a third transaction machine located at a third area of said transaction location where tellers operate said third transaction machine while said tellers and said customers interact with each other; and
   conveying means for interconnecting said first, second and third transaction machines and for aligning and transferring said transaction media between any of said first, second or third transaction machines,
   said conveying means including a first conveying unit for conveying the transaction media in a first direction thereof, a second conveying unit for conveying the transaction media in a second direction orthogonal to said first direction and clamping means for clmaping said transaction media during transfer between said first direction and said second direction;
   a first rotation mechanism which rotates in a third direction, said first rotation mechanism having a first and second rotation position, wherein said first rotation mechanism at said first rotation position contacts said transaction media to move said transaction media and said rotation mechanism at said second rotation position does not contact said transaction media;
   a second rotation mechanism which rotates in a fourth direction which is orthogonal to said third direction, said second rotation mechanism having a first and a second rotation position, wherein said second rotation mechanism at said second rotation position does not contact said transaction media; and
   posture changing means for changing said transaction media between a first posture position and a second posture position, said posture changing means including said first and second rotation mechanisms connecting said first and second conveying units for changing the posture of said transaction media between said first posture position and said second posture position.

2. A group supervisory system according to claim 1, wherein said conveying means further includes a third conveying means connected between said first and second transaction machines, a fourth conveying means connected between said first and third transaction machines and a fifth conveying means connected between said second and third transaction machines, one of said third, fourth and fifth conveying means which transfers a maximum amount of the transaction media having a minimum length of a conveying distance which is shorter than the lengths of the other of said first, second and third conveying means.

3. A group supervisory system according to claim 2, wherein said third conveying means has a length shorter than a length of said second conveying means.

4. A group supervisory system for controlling a transaction system at a transaction location, comprising:
   plural transaction machiens located at three areas of said transaction location, said plural transaction machines including plural first transaction machines located at a first area of the transaction location where a clerk operates said plural first transaction machines for controlling transaction media including bills, plural second transaction machines located at a second area of the transaction location where customers operate said plural second transaction machines and plural third transaction machines located at a third area of the transaction location where tellers operates said plural third transaction machines while said tellers and customers interact with each other, said first, second and third areas being located at different locations of said transaction location; and
   conveying means interconnecting said plural first, second and third transaction machines for aligning and transferring said transaction media between any of said plural first, second and third transaction machines,
   said conveying means including a first conveying unit for conveying the transaction media in a first direction thereof, a second conveying unit for conveying the transaction media in a second direction orthogonal to said first direction and clamping means for clamping said transaction media during transfer between said first direction and said second direction;
   a first rotation mechanism which rotates in a third direction, said first rotation mechanism having a first and second rotation position, wherein said first rotation mechanism at said first rotation position contacts said transaction media to move said transaction media and said rotation mechanism at said second rotation position does not contact said transaction media;
   a second rotation mechanism which rotates in a fourth direction which is orthogonal to said third direction, said second rotation mechanism having a first and a second rotation position, wherein said second rotation mechanism at said second rotation position does not contact said transaction media; and
   posture changing means for changing said transaction media between a first posture position and a second posture position, said posture changing means including said first and second rotation mechanisms connecting said first and second conveying units for changing the posture of said transaction media between said first posture position and said second posture position.

5. A group supervisory system according to claim 4, wherein said each of said plural transaction machines includes a buffer box for temporarily storing said transaction media and a counting unit for counting said transaction media including bills, said buffer box connecting said conveying means and said counting unit so that said buffer box stores said transaction media transferred between said conveying means and said counting unit, said counting unit being operated independently of the transaction media supplied from said conveying means.

6. A sheet conveyign system interconnecting a first and a second transaction machine for aligning and transferring transaction media, comprising:

conveying means for connecting said first and second transaction machines and for transferring said transaction media between said first transaction machine and said second transaction machine;

said conveying means including a first conveying unit for conveying the transaction media in a first direction thereof, a second conveying unit for conveying the transaction media in a second direction orthogonal to said first direction and clamping means for clamping said transaction media during transfer between said first direction and said second direction; transaction media during transfer between said first direction and said second direction;

a first rotation mechanism which rotates in a third direction, said first rotation mechanism having a first and second rotation position, wherein said first rotation mechanism at said first rotation position contacts said transaction media to move said transaction media and said rotation mechanism at said second rotation position does not contact said transaction media;

a second rotation mechanism which rotates in a fourth direction which is orthogonal to said third direction, said second rotation mechanism having a first and a second rotation position, wherein said second rotation mechanism at said first rotation position contacts said transaction media to move said transaction media and said second rotation mechanism at said second rotation position does not contact said transaction media; and posture changing means for changing said transaction media between a first posture position and a second posture position, said posture changing means including said first and second rotation mechanisms connecting said first and second conveying units for changing the posture of said transaction media between said first posture position and said second posture position.

7. A sheet conveying system as in claim 6, wherein said conveying means further includes two magnetized belts, wherein said transaction media is clamped between said two magnetized belts.

* * * * *